United States Patent [19]

Kitagawa et al.

[11] Patent Number: 5,455,290
[45] Date of Patent: Oct. 3, 1995

[54] POWDER COMPOSITION OF EPOXY RESIN, HIGH MELTING ACID ANHYDRIDE AND CALCIUM SILICATE

[75] Inventors: Katugi Kitagawa, Saitama; Akira Shinozuka, Chiba, both of Japan

[73] Assignee: Somar Corporation, Tokyo, Japan

[21] Appl. No.: 240,040

[22] Filed: May 9, 1994

Related U.S. Application Data

[63] Continuation of Ser. No. 849,813, Mar. 11, 1992, abandoned, which is a continuation of Ser. No. 365,867, Jun. 14, 1989, abandoned, which is a continuation-in-part of Ser. No. 202,779, Jun. 6, 1988, abandoned.

[51] Int. Cl.$^6$ ............................... C08K 3/10; C08K 3/34
[52] U.S. Cl. ............................... 523/443; 525/533
[58] Field of Search ............................... 523/443, 466; 525/524, 533

[56] References Cited

U.S. PATENT DOCUMENTS

| | | | |
|---|---|---|---|
| 3,269,974 | 8/1966 | Childs | 525/532 |
| 3,374,193 | 3/1968 | Tsatsos et al. | 523/458 |
| 3,484,398 | 12/1969 | Childs | 523/455 |
| 3,624,032 | 11/1971 | Miyashiro | 525/533 |
| 3,842,035 | 10/1974 | Klaren | 525/524 |
| 3,989,573 | 11/1976 | Sanjana | 525/533 |
| 4,009,223 | 2/1977 | Noonan | 525/934 |
| 4,115,296 | 9/1978 | Andrews | 525/533 |
| 4,271,061 | 6/1981 | Suzuki et al. | 523/443 |
| 4,358,552 | 11/1982 | Shinohara et al. | 523/443 |
| 4,401,776 | 8/1983 | Munk | 523/443 |
| 4,490,492 | 12/1984 | Skudelny et al. | 523/443 |
| 4,560,739 | 12/1985 | Zahir | 528/103 |
| 4,734,468 | 3/1988 | Marx | 525/524 |
| 4,764,581 | 8/1988 | Mülter et al. | 528/103 |
| 4,876,298 | 10/1989 | Itoh et al. | 523/466 |

*Primary Examiner*—Robert E. Sellers
*Attorney, Agent, or Firm*—Sughrue, Mion, Zinn, Macpeak & Seas

[57] ABSTRACT

A thermosetting epoxy resin based powder composition composed of an epoxy resin, a high-melting point polycarboxylic acid anhydride and calcium silicate as a filler, the high-melting point polycarboxylic acid anhydride comprising fine particles of 5 to 149 μm in average size that have reacted with the epoxy resin in the molten state on their surfaces.

6 Claims, No Drawings

5,455,290

POWDER COMPOSITION OF EPOXY RESIN, HIGH MELTING ACID ANHYDRIDE AND CALCIUM SILICATE

This is a continuation of application Ser. No. 07/849,813 filed Mar. 11, 1992, now abandoned which is a continuation of application Ser. No. 07/365,867, filed Jun. 14, 1989, now abandoned, which is a continuation-in-part of application Ser. No. 07/202,779, filed Jun. 6, 1988, now abandoned.

FIELD OF THE INVENTION

The present invention relates to a thermosetting epoxy resin based powder coating (which is hereinafter referred to simply as a powder coating).

BACKGROUND OF THE INVENTION

Various powder coatings have been known that consist basically of a uniform mixture of an epoxy resin, a carboxylic acid anhydride in powder form, and a filler. These powder coatings are applied by the fluidized-bed coating process, the electrostatic fluidized-bed coating process or some other suitable methods to form insulation films on electrical and electronic devices.

Powder coatings are either melt-mixed or dry-blended. In the first process, dry ingredients including an epoxy resin base and additives such as a curing agent and a filler are mixed; the premix is then melt-compounded, cooled to solidify, finely ground, and classified. In the second process, the premix of dry ingredients is pressure-compounded, finely ground and classified. If a high-melting point polycarboxylic acid anhydride used as the curing agent poorly mixes and disperses in the resin, a product having desired coating performance cannot be attained. If a low-melting point monocarboxylic acid anhydride is additionally used in an attempt to improve the dispersive miscibility of the polycarboxylic acid anhydride with the resin, the anti-blocking property and storage stability of the final product will be impaired. If the polycarboxylic acid anhydride is mixed and dispersed in the resin at elevated temperatures, the storage stability of the final product is impaired.

SUMMARY OF THE INVENTION

An object, therefore, of the present invention is to provide a thermosetting epoxy resin based powder coating that is free from the aforementioned defects of the prior art.

The thermosetting epoxy resin based powder coating of the present invention that attains this object is a powder composition which comprises (a) an epoxy resin; (b) a high-melting point polycarboxylic acid anhydride, wherein the polycarboxylic acid anhydride is an aromatic or alicyclic carboxylic anhydride of fine particles of 5 to 149 μm in average size and reacts with the epoxy resin on the particle surfaces thereof in the molten state; and (c) a calcium silicate having an acicular shape and a 50% median diameter obtained by sedimentation method of 4–10 μm as a filler, in an amount of 50 to 150 parts by weight per 100 parts by weight of the epoxy resin.

DETAILED DESCRIPTION OF THE INVENTION

The epoxy resin for use in the present invention may be selected from among known epoxy resins that are commonly used in powder coatings, such as bisphenol A epoxy resins, novolac epoxy resins, and alicyclic epoxy resins. Epoxy resins that are solid at ordinary temperatures are preferably used in the present invention and they may, if desired, be combined with epoxy resins that are liquid at ordinary temperatures in a low proportion.

The high-melting point aromatic or alicyclic polycarboxylic acid anhydride used as a curing agent in the present invention is such that it melts at a higher temperature than the epoxy resin used (if two or more epoxy resins are used, the one having the highest melting point is meant). Examples of such high-melting point polycarboxylic acid anhydride include: phthalic anhydride (m.p. 128°–130° C.), benzophenone tetracarboxylic acid dianhydride (m.p. 218°–225° C.), 5-(2,5-dioxotetrahydrofuryl)-3-methyl-3-cyclohexene-1,2-dicarboxylic acid anhydride (m.p. 167° C.), tetrahydrophthalic anhydride (m.p. 100° C.), trimellitic anhydride (m.p. 145° C.), and pyromellitic dianhydride (m.p. 265° C.). Of these, benzophenone tetracarboxylic acid dianhydride or 5-(2,5-dioxotetrahydrofuryl)-3-methyl-3-cyclohexene-1,2-dicarboxylic acid anhydride is particularly preferred.

In the present invention, the polycarboxylic acid anhydride is used in the form of fine particles of 5 to 149 μm, preferably between 5 and 44 μm, in average size. According to the studies conducted by the present inventors, when such fine particulate polycarboxylic acid anhydride was compounded into a molten epoxy resin, with the compounding temperature and time being appropriately controlled (preferably the compounding temperature being 50° to 150° C. and time being 1 to 5 minutes), the most part (preferably at least 70 wt. %) of the polycarboxylic acid anhydride used reacted with the epoxy resin on the surfaces of the particles of the anhydride and dispersed and mixed uniformly with the resin so as to provide a powder coating that had good storage stability and appearance (i.e., anti-blocking property). If the polycarboxylic acid anhydride has an average particle size exceeding 149 μm, its particles will disperse and mix in the epoxy resin only poorly during high-temperature coating operations even if the anhydride particles have been reacted with the molten epoxy resin on their surfaces. This will result in failure to produce a coating film having good appearance. In mixing the fine particulate polycarboxylic acid anhydride with the molten epoxy resin, selection of an appropriate heating temperature is also important. If the temperature for dispersing and mixing in the molten resin is excessive, most of the fine particles of the anhydride will dissolve by reacting with the resin and the storage stability of the latter will be impaired. Therefore, it is important for the purposes of the present invention that the polycarboxylic acid anhydride used as a curing agent be in fine particulate form and that the fine particles react with the resin on their surfaces without losing their shape as fine particles. Needless to say, some part of the fine particles of the polycarboxylic acid anhydride may dissolve away as a result of reaction with the molten epoxy resin. The polycarboxylic acid anhydride is incorporated in the powder coating of the present invention in an amount generally ranging from 0.45 to 1.55 equivalents, preferably from 0.65 to 1.25 equivalents, per epoxy equivalent weight of the epoxy resin.

The filler used in the present invention is a calcium silicate having an acicular shape and a 50% median diameter obtained by a sedimentation method of 4–10 μm. The filler is to be incorporated in an amount that generally ranges from 50 to 150 parts by weight, per 100 parts by weight of the epoxy resin.

Besides the ingredients described above, the powder coating of the present invention may also incorporate some other common additives such as a cure accelerator (e.g., imidazole, dicyandiamide and tertiary amine), a pigment (e.g., chromium oxide and red iron oxide) and a flow-control agent (e.g., acrylic ester oligomer).

The following example is provided for the purpose of further illustrating the present invention but is in no way to be taken as limiting.

EXAMPLES 1–7

A hundred parts by weight of Epikote 1002 (the trade name of Yuka-Shell Epoxy Co., Ltd. for a bisphenol A epoxy resin that is solid at ordinary temperature and which has a melting point of 83° C.) was provided. To this epoxy resin, 100 parts by weight of fine particulate calcium silicate (wollastonite P-4 made by Interpace Corp.; 50% median diameter measured by sedimentation method, 5.5 μm; acicular powder) and one of the polycarboxylic acid anhydrides shown in Table 1 as curing agents were added. The ingredients were melt-mixed under heating, cooled to solidify, and finely ground.

The resulting coating powders were visually checked for their appearance (anti-blocking property). At the same time, the storage stability of these powders was evaluated by the following method. The results are shown in Table 1.

Test for Storage Stability

The gel time (at 150° C.) of each powder was measured at immediately after preparation (initial) and 7 days after its preparation and the change that occurred was measured in accordance with JIS C-2104.

The symbols appearing in the column of "Curing Agent" in Table 1 have the following meanings:

BTDA, benzophenone tetracarboxylic acid dianhydride;
MCTC, 5-(2,5-dioxotetrahydrofuryl)-3-methyl-3-cyclohexene-1,2-dicarboxylic acid anhydride;
THPA, tetrahydrophthalic anhydride.

EXAMPLE 8

A hundred parts by weight of Epikote 1002 (the trade name of Yuka-Shell Epoxy Co., Ltd. for a bisphenol A epoxy resin that is solid at ordinary temperature and which has a melting point of 83° C.) was provided. To this epoxy resin, 100 parts by weight of fine particulate calcium silicate (wollastonite P-4 made by Interpace Corp,; 50% median diameter measured by sedimentation method, 5.5 μm; acicular powder) and 21.5 parts by weight of benzophenone tetracarboxylic acid dianhydride (average particle size: 25 μm) as a curing agent were added. The ingredients were melt-mixed under heating, cooled to solidify, and finely ground to prepare a coating powder.

EXAMPLE 9

Example 8 was repeated except that 8.0 parts by weight of dicyandiamide (abbreviated as DICY, melting point of 208° C., average particle diameter of 74 μm) was used as a curing agent instead of 21.5 parts by weight of the benzophenone tetracarboxylic acid dianhydride.

EXAMPLE 10

Example 8 was repeated except that 100 parts by weight of silica (average particle size of 25 μm) was used instead of the fine particulate calcium silicate.

The coating powders prepared in Examples 8 to 10 were visually checked for their appearance. At the same time, the storage stability of these powders was evaluated in the same manner as in Examples 1 to 7.

Further, glass transition point, cutting property and tensile strength of these powders, were evaluated by the following method.

1. Glass transition point

TABLE 1

| | Curing Agent | | | Melt-mixing | | | Storage stability | | Appearance of film (visually checked) |
|---|---|---|---|---|---|---|---|---|---|
| Run No. | Type | Average particle size (μm) | Amount (parts by weight) | Temp. (°C.) | Time (min) | Appearance of powder | Initial (sec) | 7 days after (sec) | |
| 1 | BTDA | 25 | 21.5 | 70–100 | 1–2 | good | 130 | 131 | good |
| 2* | " | 200 | " | " | " | good | 260 | 260 | poor |
| 3* | " | " | " | 180–200 | " | fair | 75 | 63 | good |
| 4 | MCTC | 21 | 17.3 | 70–100 | 3–4 | good | 102 | 100 | good |
| 5* | " | " | " | 150–180 | " | fair | 59 | 43 | good |
| 6 | THPA | 18 | 19.8 | 50–80 | 1–2 | good | 185 | 182 | good |
| 7* | " | " | " | 90–150 | " | poor | 124 | 90 | good |

*Comparative samples

As will be understood the data shown in Table 1, the coating powder samples prepared in accordance with the present invention have the high-melting point polycarboxylic acids (curing agent) dispersed and mixed sufficiently uniformly in an epoxy resin to provide good appearance (anti-blocking property). When these powders are coated on electrical or electronic devices, they produce insulation films having few pinholes or voids, thereby increasing the reliability of the electrical or electronic devices. As a further advantage, the powder coating of the present invention has excellent storage stability.

A test piece (3 mm thickness) which is obtained by curing the powder coating at 220° C. for 60 minutes was provided. With respect to the test piece, an inflection point of thermal expansion curve was measured. This point means a glass transition point (Tg).

2. Cutting test

Soft steel (S 15C according to JIS G4051; 12×12×100 mm) heated to 180°–200° C. was coated with the powder coating so that thickness is 3–5 mm. The coated steel was cured at 220° C. for 60 minutes to prepare a test piece. The test piece was cut by using a cut-off tool, and cracking and breaking at the cutting was checked.

Cutting condition:

Cutting speed: 140 m/min.
Feed rate: 0.1/rev
Cut-off tool: A-40 (according to JIS B4151)

●: No cracking or breaking per ten-piece cutting was recognized.

○: It was found that one or two pieces are cracked or broken per ten-piece cutting.

X: It was found that five pieces are cracked or broken per ten-piece cutting.

3. Tensile strength

A mold in the form of No. 1 type test piece according to JIS K7113 was previously heated to 150° C. To this mold, the powder coating was applied by fluidized-bed coating process, and then cured at 220° C. for 60 minutes to prepare a test piece. Test for tensile strength was conducted in the tensile rate of 5±1 mm/min.

The results are shown in Table 2.

TABLE 2

| Run No. | Curing Agent | | | Filler | | | Melt-mixing | |
|---|---|---|---|---|---|---|---|---|
| | Type | Average Particle Size (μm) | Amount (parts by weight) | Type | Average Particle Size (μm) | Amount (parts by weight) | Temp. (°C.) | Time (min) |
| 8 | BTDA | 25 | 21.5 | Calcium Silicate | 5.5 | 100 | 70–100 | 1–2 |
| 9* | DICY | 74 | 8.0 | Calcium Silicate | 5.3 | 100 | 70–100 | 1–2 |
| 10* | BTDA | 25 | 21.5 | Silica | 25 | 100 | 70–100 | 1–2 |

| Run NO. | Storage Stability | | | Film Performance | | | |
|---|---|---|---|---|---|---|---|
| | Appearance of Powder | Initial (sec) | 7 Days After (sec) | Appearance of Film (visually checked) | Tg (°C.) | Cutting Property (abrasion by cutting) | Tensile Strength (Kg/mn) |
| 8 | good | 130 | 131 | good | 155 | ○ | 3.6 |
| 9 | good | 70 | 65 | good | 120 | ○ | 3.5 |
| 10 | good | 128 | 130 | good | 150 | X | 3.0 |

*Comparative samples

While the invention has been described in detail and with reference to specific embodiments thereof, it will be apparent to one skilled in the art that various changes and modifications can be made therein without departing from the spirit and scope thereof.

What is claimed is:

1. A thermosetting epoxy resin based powder composition which comprises:

(a) an epoxy resin;

(b) a high-melting point polycarboxylic acid anhydride, wherein said polycarboxylic acid anhydride is an aromatic or alicyclic carboxylic acid anhydride of fine particles of 5 to 149 μm in average size and said particles react with said epoxy resin on the particle surfaces thereof in the molten state; and (c) a calcium silicate having an acicular shape and a 50% median diameter obtained by sedimentation method of 4–10 μm as a filler, in an amount of 50 to 150 parts by weight per 100 parts by weight of said epoxy resin.

2. A thermosetting epoxy resin based powder composition as in claim 1, wherein said epoxy resin is selected from bisphenol A epoxy resins, novolac epoxy resins and alicyclic epoxy resins.

3. A thermosetting epoxy resin based powder composition as in claim 1, wherein said high-melting point polycarboxylic acid anhydride is selected from the group consisting of phthalic anhydride, benzophenone tetracarboxylic acid dianhydride, 5-(2,5-dioxotetrahydrofuryl)-3-methyl-3-cyclohexene-1,2-dicarboxylic acid anhydride, tetrahydrophthalic anhydride, trimellitic anhydride, and pyromellitic dianhydride.

4. A thermosetting epoxy resin based powder composition as in claim 1, wherein the average particle size of said high-melting point polycarboxylic acid anhydride is 5–44 μm.

5. A thermosetting epoxy resin based powder composition as in claim 1, wherein the amount of said polycarboxylic acid anhydride is from 0.45 to 1.55 equivalents per epoxy equivalent weight of said epoxy resin.

6. A thermosetting epoxy resin based powder composition as in claim 3, wherein said high-melting point polycarboxylic acid anhydride is benzophenone tetracarboxylic acid dianhydride or 5-(2,5-dioxotetrahydrofuryl)-3-methyl-3-cyclohexene-1,2-dicarboxylic acid anhydride.

\* \* \* \* \*